United States Patent [19]

Sicre

[11] 4,331,032
[45] May 25, 1982

[54] VARIOMETERS

[75] Inventor: Jean-Luc Sicre, Fontenay-aux-Roses, France

[73] Assignee: S.F.E.N.A., Velizy-Villacoublay, France

[21] Appl. No.: 113,829

[22] Filed: Jan. 21, 1980

Related U.S. Application Data

[63] Continuation of Ser. No. 903,875, May 8, 1978, abandoned.

[30] Foreign Application Priority Data

May 10, 1977 [FR] France .................................. 77 14294

[51] Int. Cl.³ .............................................. G01C 21/10
[52] U.S. Cl. ...................................................... 73/179
[58] Field of Search .................. 73/179, 178 T, 178 R, 73/178 H, 181

[56] References Cited

U.S. PATENT DOCUMENTS

| 2,973,643 | 3/1961 | Roderick et al. | 73/179 |
| 3,496,769 | 2/1970 | Vietor | 73/178 T |
| 3,683,690 | 8/1972 | Andresen | 73/179 |
| 4,250,746 | 2/1981 | Vassie et al. | 73/179 |

Primary Examiner—Donald O. Woodiel
Attorney, Agent, or Firm—Scully, Scott, Murphy & Presser

[57] ABSTRACT

A variometer for an aerodyne. The variometer has at least one dial conventionally graduated to represent speed, a needle indicating on said graduation the instantaneous vertical speed. The variometer also has an indicator which is representative of the potential vertical speed, and can move around the dial so that the position of the indicator with respect to the needle indicates instantaneously the acceleration on the trajectory of the aircraft.

14 Claims, 7 Drawing Figures

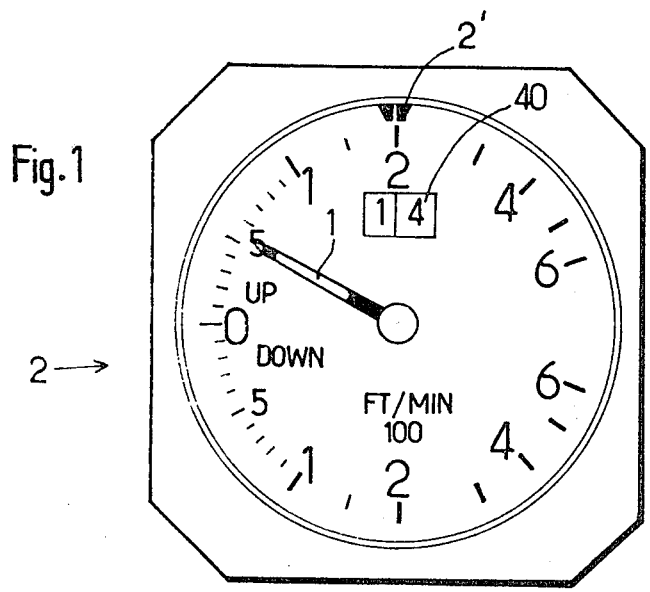
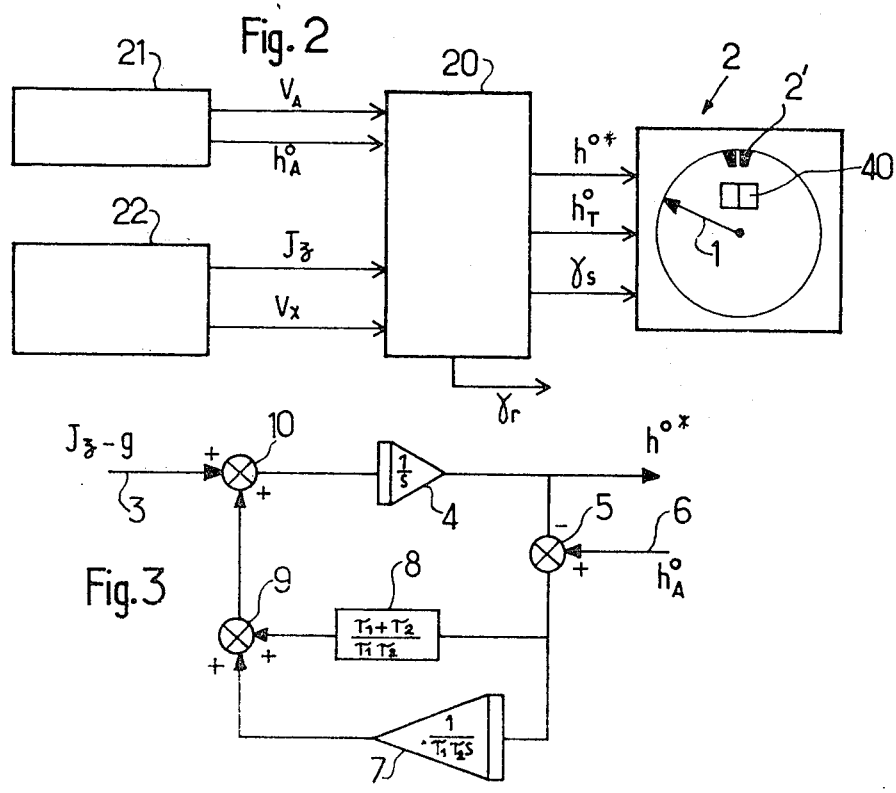

VARIOMETERS

This is a continuation of application Ser. No. 903,875, filed May 8, 1978, now abandoned.

The present invention relates to an improved variometer intended for equipping aerodynes, such as for example aircraft.

It is known that variometers are instruments serving for flying aerodynes and which provide information about the vertical speed of the aerodyne. This instrument generally comprises a dial graduated in feet/minute or in meters/second and a needle which provides the pilot with information about the vertical speed of the aerodyne.

The signal representative of this vertical speed is generally provided by a central anemometric unit and a calculation member in particular carrying out filtration to eliminate all parasite noises detected.

A first drawback of these systems comes from this filtering, which is indispensable owing to the high level of noise, but which introduces a considerably delay in the display of the anemometric speed and compels the pilot to correct the value shown mentally by anticipation.

A first purpose of the invention is thus to provide the generation of a signal taking into account the vertical speed of the aerodyne and in which the delay due to filtering noise is compensated for. As will be explained hereafter in the description, the invention achieves this result by adding to the compensated vertical speed a phase lead which depends on the acceleration along the vertical axis.

A second purpose of the invention is to add to this information relating to the instantaneous vertical speed of the aerodyne, information relating to the potential vertical speed of the aerodyne and this is such that it is possible to deduce instantaneously and directly, information relating to the acceleration on the trajectory of the aerodyne. The invention achieves this result by displaying the potential vertical speed by means of an indicator able to move around the dial.

Thus, according to one feature of the invention, the variometer comprises essentially, in combination, a dial comprising in a conventional manner, a graduation in feet/minute, a needle indicating the instantaneous vertical speed, an indicator of potential vertical speed, able to move around the dial and whose position, with respect to the needle for vertical speed, indicates instantaneously the acceleration on the trajectory of the aerodyne and possibly an indication by a digital display of the gradient of the aircraft (gradient with respect to the air or gradient with respect to the ground).

It should be noted that the indication of the acceleration on the trajectory of the aircraft could not be obtained if the conventional stabilized vertical speed signal were used for controlling the needle of the variometer and this is owing to the delay.

Naturally, the invention proposes to obtain these results by a calculation process making it possible to satisfy the strictest criteria, in particular as regards the speed of response, the rapidity, the accuracy of the indications, reliability and the cost price.

The invention also intends to find a method having acceptable behaviour in the case of a wind gradient and this is by linking, at low speed, the potential vertical speed to the air speed rather than solely to the ground speed.

One embodiment of the invention will be described hereafter, as a non-limiting example, with reference to the accompanying drawings in which:

FIG. 1 shows diagrammatically the front face of a variometer;

FIG. 2 is a block diagram making it possible to illustrate the principle of controlling the variometer;

FIG. 3 is a block diagram of the system for calculating the instantaneous vertical speed;

Figure 4:
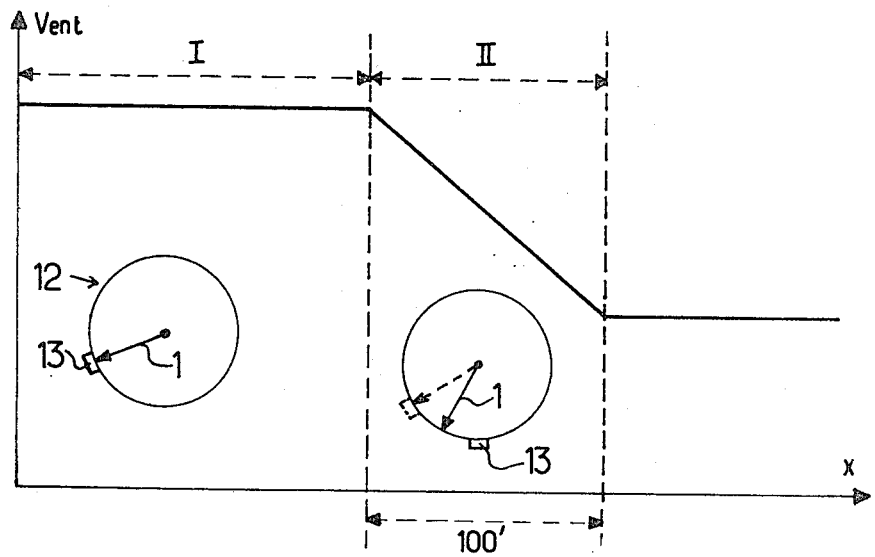
FIG. 4 is a diagram illustrating the behaviour of the variometer in the case of a wind gradient.

It will firstly be noted that in conventional variometers, the stabilized signal $h^o$ used for the display of the vertical speed of the aerodyne is in the form:

$$h^o = \frac{h^o{}_A}{1 + \tau S}$$

a formula in which:

$h^o{}_A$ is the vertical speed signal provided by a central anemometric unit, $\tau$ is a time constant of approximately 5 secs, S is the Laplace operator and the expression $1/(1+\tau S)$ is the transmittance of a filter intended to eliminate noise.

It is clear that the delay caused by filtering the signal emanating from the central anemometric unit compels the pilot to make a correction by mental calculation, in order to evaluate the instantaneous vertical speed of the aerodyne.

To eliminate this drawback and to obtain a signal representative of the instantaneous vertical speed of the aerodyne, the invention proposes to add to the compensated vertical speed, a phase lead which depends on the acceleration $J_z$, (component of acceleration along the vertical axis), this acceleration being able to be provided by a conventional central accelerometric unit or inertial platform. As will be seen from the ensuing description, this phase lead is obtained by a complementary filter of the second order.

Thus, according to one feature of the invention, the expression $h^{*o}$ of the signal of instantaneous vertical speed controlling the needle 1 of the variometer 2 illustrated in FIG. 1 is in the form:

$$h^{*o} = \frac{h^o{}_A}{1 + \tau_1 S} \times \frac{1 + (\tau_1 + \tau_2)S}{1 + \tau_2 S} + \frac{\tau_1}{1 + \tau_1 S} \times \frac{\tau_2}{1 + \tau_2 S} (J_z - g)$$

a formula in which:

$h^{*o}$ is the signal of instantaneous vertical speed, $h^o{}_A$ is the signal of vertical speed emanating from the central anemometric unit, $\tau_1$ is a time constant, for example of 5 secs, $\tau_2$ is a time constant, for example of 20 secs, S is the Laplace operator, $J_z$ is the component of acceleration on the vertical g is the acceleration of gravity.

The circuit making it possible to obtain the signal of instantaneous vertical speed may be constructed as shown in FIG. 3 and may comprise:

a direct chain, whereof the input 3 receives a signal representative of the expression ($J_z - g$), this direct chain comprising an integrator 4 (transfer function $1/S$) the output of which supplies the signal $h^{*o}$ of instantaneous vertical speed, a counter-feed-back loop comprising a first subtractor 5 receiving a signal $h^o_A$ (input 6) of the vertical speed coming from the central anemometric unit of the aerodyne, the output of this subtractor 5 is connected, on the one hand, to an integrator 7 (transfer function $1/\tau_1\tau_2 S$) and to an amplifier 8 for the gain $(\tau_1+\tau_2)/(\tau_1\tau_2)$, these two members being arranged in parallel and connected by their output to the two inputs of an adder 9, the adder 9 itself being connected to an adder 10 connected in the direct chain, upstream of the integrator 4.

As regards the signal making it possible to actuate the indicator indicating on the variometer the potential vertical speed of the aerodyne, this signal has the form:

$$h^\circ_T = h^{\circ *} + \frac{1}{g} V_x \cdot \frac{dV_x}{dt} \qquad (1)$$

a formula in which:
$h^{o*}$ is the vertical speed,
g is the acceleration of gravity,
$V_x$ is the ground speed provided by an inertial unit.

It should be noted that this formula introduces the concept of total energy in the indications provided by the variometer.

In fact, starting with the expression of total energy $E_T$ of the aerodyne, $$E_T = \tfrac{1}{2} m V^2 S + mgH \qquad (2)$$

in which:
m is the mass of the aerodyne,
VS is the ground speed,
H is the altitude,
one deduces the following expressions:

$$\frac{E^\circ_T}{mg} = \frac{1}{g} VS \frac{dVS}{dt} + \frac{dh}{dt} \qquad (3)$$

$$\frac{E^\circ_T}{mg} = h^\circ_T = h^\circ \text{ true} + \frac{1}{g} VS \frac{dVS}{dt} \qquad (4)$$

According to one feature of the invention, by effecting an approximation, it is possible to deduce from the formula (4), the expression of potential vertical speed (1) and thus to reveal the concept of total energy which is the basis of this information.

As afore-mentioned, the distance between the needle 1 of the variometer and the indicator 2' is representative of the acceleration of the aerodyne on its trajectory. In a given configuration, this distance represents the vertical speed of which the aircraft is capable in order to have a stable air speed.

Thus, in order to ensure that the aerodyne maintains a stable air speed, it is sufficient to keep the needle and the indicator in alignment.

One important advantage of the variometer according to the invention consists in that it has coherent behaviour in the case of a wind gradient.

This behaviour is directly valid as regards high air speeds (V air > 150 knots).

However, as regards low speeds, it is sufficient to make a correction. According to another feature of the invention, this correction is obtained by effecting mixing of the anemometric speed and of the air speed.

Thus, at low speed, instead of generating a signal of the form:

$$h^\circ_T = h^{\circ *} + \frac{1}{g} V_x \cdot \frac{dV_x}{dt}$$

one generates a signal of the form:

$$h^\circ_T = h^{\circ *} + \frac{1}{g}\left( \frac{1}{1+\tau_3 S} \times \frac{dV_a}{dt} + \frac{\tau_3 S}{1+\tau_3 S} \frac{dV_x}{dt} \right) \times \frac{V_x}{1+\tau_4 S}$$

in which:
Va is the air speed,
Vx is the anemometric speed,
$\tau_3$ is a time constant, for example of the order of 10 secs,
$\tau_4$ is a time constant, for example of the order of 3 secs.

FIG. 4 makes it possible to illustrate the behaviour of the variometer in the case of a wind gradient which is represented by the curve of the wind as a function of the trajectory.

During phase I preceding the wind gradient, the speed of the aircraft on its trajectory is stabilized and consequently the needle 1 of the variometer 12 is in alignment with the indicator 13.

During the phase II which is the phase where the wind gradient proper occurs, it will be seen that the needle of the variometer drops and the indicator 13 drops further.

In a parallel manner, the trajectory also drops, which involves action on the joystick and a drop in speed which requires action on the throttle lever.

The action which ensures the safety of the aircraft will thus consist firstly of re-establishing the vertical speed (needle 7) to the value previously recorded and, in addition, to act on the throttle lever in order to bring the indicator into alignment with the needle.

Figure 5:
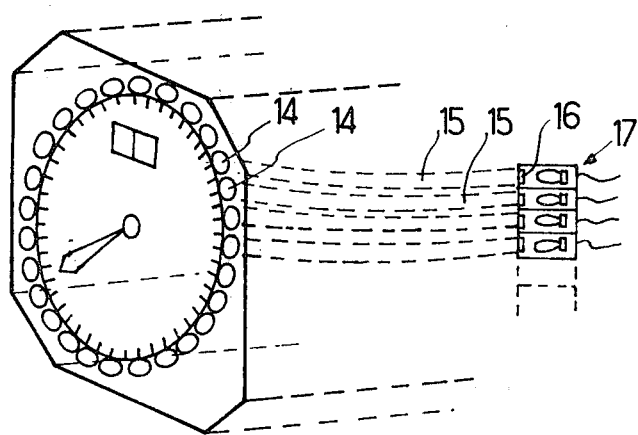
FIG. 5 is a diagrammatic illustration making it possible to illustrate the principle of the system for actuating the indicator.

As shown in FIG. 5, the indicator may consist of a luminous indicator by means of the emitting ends 14 of bundles of optic fibres 15 whose receiving ends 16 are connected to a set of lamps 17 at the rate of one lamp per bundle. It should be noted that for reasons of safety (failure of a lamp) the indicator is activated by the juxtaposition of the ends of two consecutive bundles of optic fibres which are consequently illuminated by two separate lamps. Thus, in order that the failure of a lamp puts the display using the indicator out of use, it is necessary that at least two consecutive lamps fail simultaneously. Furthermore a lamp failure may be easily detected without it being necessary to undertake investigations in the associated electronic circuits.

Naturally, from the signal of potential vertical speed, the indicator could be activated in any other manner, for example by means of a succession of cells having liquid crystals.

It is obvious that in the two afore-mentioned cases, the actuation of the indicator as well as the digital display of the aeronautical gradient may be generated from digital signals decoded in the variometer. On the other hand, the signal controlling the needle may itself be an analog signal.

Processing of the signals representative of $h^{o*}$, $h^o{}_T$ and $\gamma S$ takes place by means of a central unit 20 which receives, on the one hand, from a central anemometric unit 21, signals representative of the air speed $V_a$ and of the vertical speed of the aircraft $h^o{}_A$ and, on the other hand, from an inertial platform 22, which provides signals representative of the acceleration $J_z$ and of the ground speed Vx.

It should be noted that from the said data, the central unit 20 is advantageously able to provide information relating to the total energy $\gamma_T$, which information can be used by numerous instruments on board the aerodyne, such as the automatic pilot system, flight control horizons etc.

The transfer of data processed in the central unit, to the variometer may take place, for example as regards the value $h^{o*}$, by the analog route by means of conventional leads.

On the other hand, as regards digital information, representative of the values $h^o{}_T$ and $\gamma S$ and possibly, other values which can be displayed digitally on the variometer, this transfer takes place by means of a parallel multiplexed bus.

For the transmission of binary information, this solution makes it possible to use a minimum number of leads, whereof the number is equal to the maximum number of bits of the binary numbers used.

Furthermore, owing to the inertia (or hysteresis) of the display methods used (lamps associated with optic fibres or electro-luminescent diodes for the digital display) it is possible to transmit the various information such as $h^*{}_T$ or $\gamma S$, by means of the same leads.

To this end, one obtains the values of $h^*{}_T$ and $\gamma S$ or the like, provided by the central unit and transmits them sequentially on the conductors of the bus.

Figure 6:
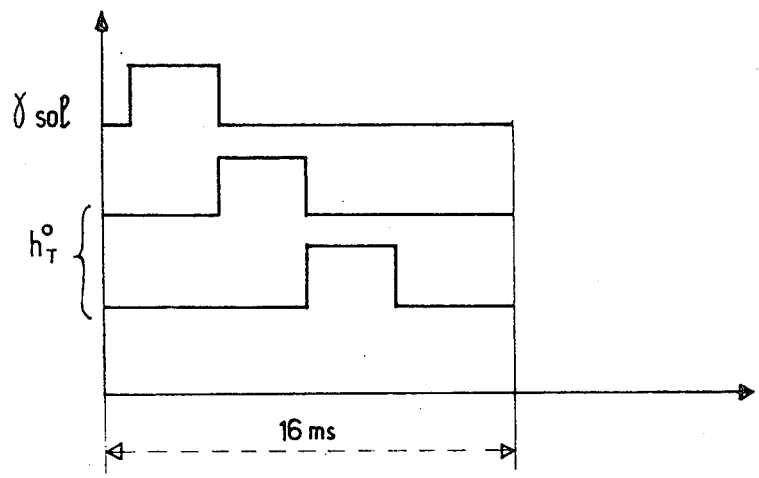
FIG. 6 is a diagram representative of a sequence for the transmission of information relative to $h^o{}_T$ and $\gamma S$ between the calculator and the variometer.

Thus, as shown in FIG. 6, a transmission sequence may have a duration of the order of 16 m secs and comprise a first pulse representative of the value $h^o{}_T$, then a second pulse representative of $\gamma$ground.

During the same sequence, it is also possible to emit two pulses representative of the same parameter such as for example $h^o{}_T$.

Figure 7:
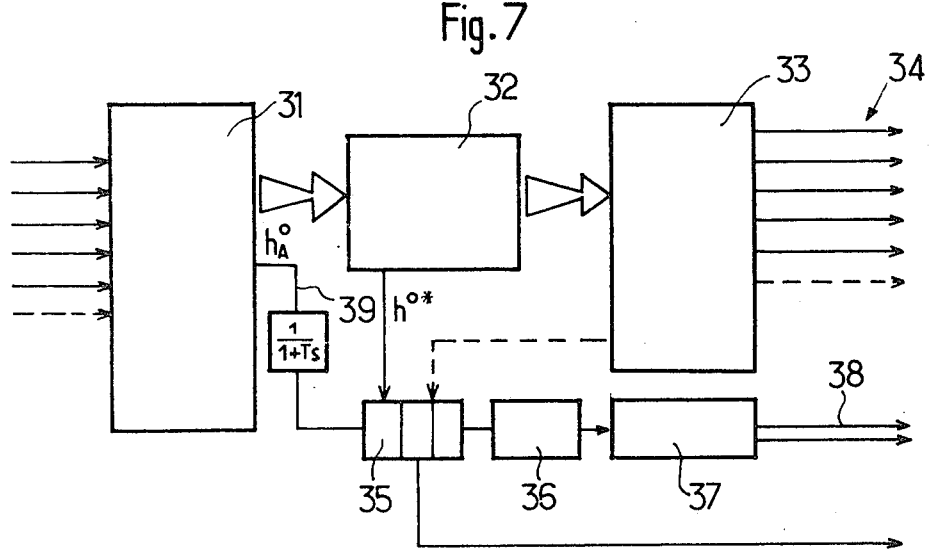
FIG. 7 is a block diagram showing the safety system associated with the variometer.

As regards the operating safety of the variometer, the invention provides a safety system such as that illustrated in FIG. 7.

The circuit illustrated in FIG. 8 firstly comprises an analog/digital converter 31 which receives the information from the inertial platform and the central anemometric unit. This converter 31 supplies information relating to the various parameters such as Va, $h^oA$, Jz and Vx to the central unit 32 which processes the signals $h^{o*}$, $h^o{}_T$ and $\gamma S$ and on the one hand transmits the digital data relating to $h^o{}_T$ and $\gamma$ ground to a sequencer 33 connected to the leads of the bus 34 and on the other hand the data relating to $h^{o*}$ to a selector 35 connected to a linear/logarithmic converter 36, then to a digital/analog converter 37 connected by a conventional lead 38 to the variometer.

The selector is also connected to a circuit 39 providing information relating to the delayed vertical speed $$h^o \times \frac{h^oA}{1 + \tau S}$$

Thus, in the case where a breakdown of the central unit 32 for example occurs, the selector makes it possible to transmit to the variometer (for controlling the needle 1) the information relating to the delayed vertical speed $h^o$ and in parallel, it emits a signal making it possible to cancel the indicator and the digital display, by interrupting the power supply to these members. One thus obtains an operation similar to that of a conventional variometer.

According to another emergency method, in the case where a vertical speed signal $h^oA$ in analog form is available in the central anemometric unit, the safety circuit may comprise a switch in the vicinity of the variometer, which switch makes it possible to control the needle 1 directly by means of said analog signal. In this case, the decimals/logarithmic conversion may be undertaken mechanically by means of a conventional cam.

In the case where all the indications are not available, the invention provides means for indicating to the pilot that the variometer is not available, these means being able to cover the display in the window 40 providing the digital information, with the appearance of a caption such as for example the caption "off."

What is claimed is:

1. An improved variometer system for an aircraft having a dial with graduations representative of speed, comprising:
   a. means for determining the instantaneous vertical speed of the aircraft;
   b. means, responsive to said determining means, for displaying the instantaneous vertical speed of the aircraft, including a needle for indicating the instantaneous vertical speed on said graduations;
   c. means for determining the potential vertical speed of the aircraft, which is based on the total kinetic and potential energy of the aircraft; and
   d. at least one indicator, responsive to said determining means of potential vertical speed, for displaying potential vertical speed, said indicator being movable around the dial and the position of which with respect to said needle indicates the instantaneous acceleration on the trajectory of the aircraft.

2. An improved variometer as claimed in claim 1, including a digital display means for indicating the gradient of the aircraft.

3. A system as claimed in claim 1, including means for generating a signal representative of the instantaneous vertical speed $h^{*o}$ which is used in the variometer, said signal being obtained by the calculation, $$h^{*o} = \frac{h^oA}{1 + \tau_1 S} \times \frac{1 + (\tau_1 + \tau_2)S}{1 + \tau_2 S} + \frac{\tau_1}{1 + \tau_1 S} \frac{\tau_2}{1 + \tau_2 S}(J_z - g)$$

in which
$h^{*o}$ is the signal of instantaneous vertical speed,
$h^oA$ is a signal of vertical speed possibly coming from a central anemometric unit,
$\tau_1$ is a time constant,
$\tau_2$ is a time constant,
S is the Laplace operator,
$J_z$ is the component of acceleration on the vertical axis, and
g is the acceleration of gravity.

4. A system as claimed in claim 3, comprising a circuit having:

a. a direct chain, the input of which receives a signal representative of the expression $(J_z-g)$, comprising an integrator having a transfer function $1/S$, the output of which provides the signal $h^{*o}$ of instantaneous vertical speed; and b. a counter-feedback loop comprising a first subtractor receiving a signal $h^o{}_A$ of vertical speed, the output of said first subtractor connected to a transfer function integrator $1/(\tau_1\tau_2 S)$ and also to an amplifier $(\tau_1+\tau_2)/(\tau_1\times\tau_2)$, said integrator and said amplifier being arranged in parallel and coupled by their outputs to two inputs of an adder which is serially connected to a second adder in the direct chain, before the integrator of the transfer function $1/S$.

5. A system as claimed in claim 1, including means for generating a signal representative of the potential vertical speed $h^o{}_T$ of an aircraft to activate said indicator, in which the signal is obtained by the calculation, $$h^\circ{}_T = h^\circ{}^* + \frac{1}{g} V_x \cdot \frac{dV_x}{dt}$$

in which
 $h^o$ is the vertical speed,
 g is the acceleration of gravity, and
 Vx is the ground speed provided by a central inertial unit.

6. A system as claimed in claim 1, including means for generating a signal representative of the potential vertical speed $h^o{}_T$ of an aircraft for activating said indicator in which the signal is obtained by the calculation, $$h^\circ{}_{T_i} = h^\circ{}^* + \frac{1}{g}\left(\frac{1}{1+\tau_3 S}\times\frac{dV_a}{dt}+\frac{\tau_3 S}{1+\tau_3 S}\frac{dV_x}{dt}\right)\times\frac{V_x}{1+\tau_4 S}$$

in which
 Va is the air speed,
 Vx is the anomemetric speed,
 $\tau_3$ is a time constant, of approximately 10 seconds, and
 $\tau_4$ is a time constant, of approximately 3 seconds.

7. A variometer as claimed in claim 1, said indicator including the emitting ends of at least one bundle of a set of bundles of optic fibres wherein the other ends are connected to a set of lamps, with one lamp being provided per bundle.

8. A variometer as claimed in claim 1, said indicator being activated by the emitting ends of two adjacent bundles of optic fibres.

9. A system as claimed in claim 1, in which the signals representative of $h^{o*}$, $h^o{}_T$, $\gamma S$ and the total gradient $\gamma_T$ are processed in a central unit which receives, from a central anemometric unit, signals representative of the air speed Va and of the vertical speed of the aircraft $h^o{}_A$, and also, from an inertial platform signals representative of the acceleration $J_z$ and of the ground speed Vx, the transfer of the value $h^{o*}$ to the variometer being by analog signals, and the transfer of digital information representative of the values of $h^o{}_T$ and $\gamma S$, which are displayed digitally on the variometer, is by a parallel multiplexed bus.

10. A variometer as claimed in claim 9, the processing means for the signals representative of $h^{o*}$, $h^o{}_T$ and $\gamma S$ comprising an analog converter receiving signals from an inertial platform and from a central anemometric unit which supplies signals for the parameters Va, $h^o{}_A$, $J_z$ and Vx to said central unit which processes the signals $h^{o*}$, $h^o{}_T$ and $\gamma S$ and transmits digital signals for $h^o{}_T$ and $\gamma$ ground to a sequencer connected to the leads of said bus and also, signals for $h^{o*}$, to a selector connected to a linear/logarithmic converter then to a digital-/analog converter connected to said variometer.

11. A variometer as claimed in claim 10, in which the signals $h^*{}_T$ and $\gamma S$ provided by the central unit are sampled and transmitted sequentially to the leads of the bus.

12. A variometer as claimed in claim 11, in which transmission sequence comprises a pulse representative of $\gamma$ ground and two pulses representative of $h^o{}_T$.

13. A variometer as claimed in claim 10, in which said selector is also connected to a circuit providing signals for the delayed vertical speed $h^o = h^oA/(1+\tau S)$ and also switching means effecting the control of said selector in order to transmit to the variometer said signals for the delayed vertical speed, in the case of a malfunction of the central unit and, also a signal cancelling the indicator and digital display of the variometer, and displaying a signal indicative of the breakdown.

14. A variometer as claimed in claim 10, comprising in the central anemometric unit, a digital signal of vertical speed $h^o{}_A$, a safety circuit comprising, in the variometer, switching means for controlling the needle directly by said digital signal, the decimal/logarithmic conversion being accomplished mechanically by a conventional cam.

* * * * *